United States Patent [19]
Jakubowski, Jr.

[11] Patent Number: 5,583,312

[45] Date of Patent: Dec. 10, 1996

[54] COLD GAS EJECTOR RACK

[75] Inventor: Thaddeus Jakubowski, Jr., Mesa, Ariz.

[73] Assignee: McDonnell Douglas Helicopter Company, Mesa, Ariz.

[21] Appl. No.: 397,656

[22] Filed: Mar. 1, 1995

[51] Int. Cl.⁶ ................................................ B64D 1/04
[52] U.S. Cl. .................................... 89/1.54; 244/137.4
[58] Field of Search ............................ 89/1.54, 1.51, 89/1.59; 244/137.4

[56] References Cited

U.S. PATENT DOCUMENTS

| | | |
|---|---|---|
| 3,306,164 | 2/1967 | Rad, Jr. . |
| 3,611,865 | 10/1971 | Schallert ............................... 89/1.51 |
| 3,787,012 | 1/1974 | Jakubowski, Jr. . |
| 3,887,150 | 6/1975 | Jakubowski, Jr. . |
| 4,040,334 | 8/1977 | Smethers, Jr. . |
| 4,043,525 | 8/1977 | Jakubowski, Jr. . |
| 4,089,250 | 5/1978 | Jakubowski, Jr. et al. . |
| 4,095,762 | 6/1978 | Holt . |
| 4,183,480 | 1/1980 | Jakubowski, Jr. . |
| 4,204,456 | 5/1980 | Ward . |
| 4,246,472 | 1/1981 | Sun et al. ................................ 235/401 |
| 4,343,447 | 8/1982 | Reed, III ............................... 244/137.4 |
| 4,347,777 | 9/1982 | Jakubowski, Jr. et al. . |
| 4,388,853 | 6/1983 | Griffin et al. ........................... 89/1.57 |
| 4,399,968 | 8/1983 | Stock et al. . |
| 4,444,085 | 4/1984 | Dragonuk ................................. 89/1.51 |
| 4,520,975 | 6/1985 | Blackhurst ............................. 244/137.4 |
| 4,523,731 | 6/1985 | Buitekant et al. . |
| 4,552,327 | 11/1985 | Carter . |
| 4,905,568 | 3/1990 | Hetzer et al. . |
| 4,934,667 | 6/1990 | Dees et al. ............................ 267/64.21 |
| 4,998,480 | 3/1991 | Denis et al. . |
| 5,029,776 | 7/1991 | Jakubowski et al. . |
| 5,351,597 | 10/1994 | Holmström et al. ...................... 89/6.5 |
| 5,487,322 | 1/1996 | Rhodes ................................... 89/1.56 |

*Primary Examiner*—Michael J. Carone
*Assistant Examiner*—Christopher K. Montgomery
*Attorney, Agent, or Firm*—Donald E. Stout

[57] ABSTRACT

There is provided a renewable energy source ejector rack for retaining and releasing stores (bombs or the like) on an aircraft, which has on-board pressurization capability, employs a single pressurization system for two or more release mechanisms, and uses air or other clean non-pyrotechnic pressurized gases both as the energy source and energy transfer medium. The aircraft contains a miniature compressor and purification system. Ambient air is filtered, dried and stored as an energy medium. Since the compressor system is onboard, the pressure can be constantly maintained regardless of temperature change. Using purified air eliminates the excessive cleaning burden imposed when using state-of-the-art pyrotechnics, and eliminates the sealing problems associated with hydraulics.

20 Claims, 3 Drawing Sheets

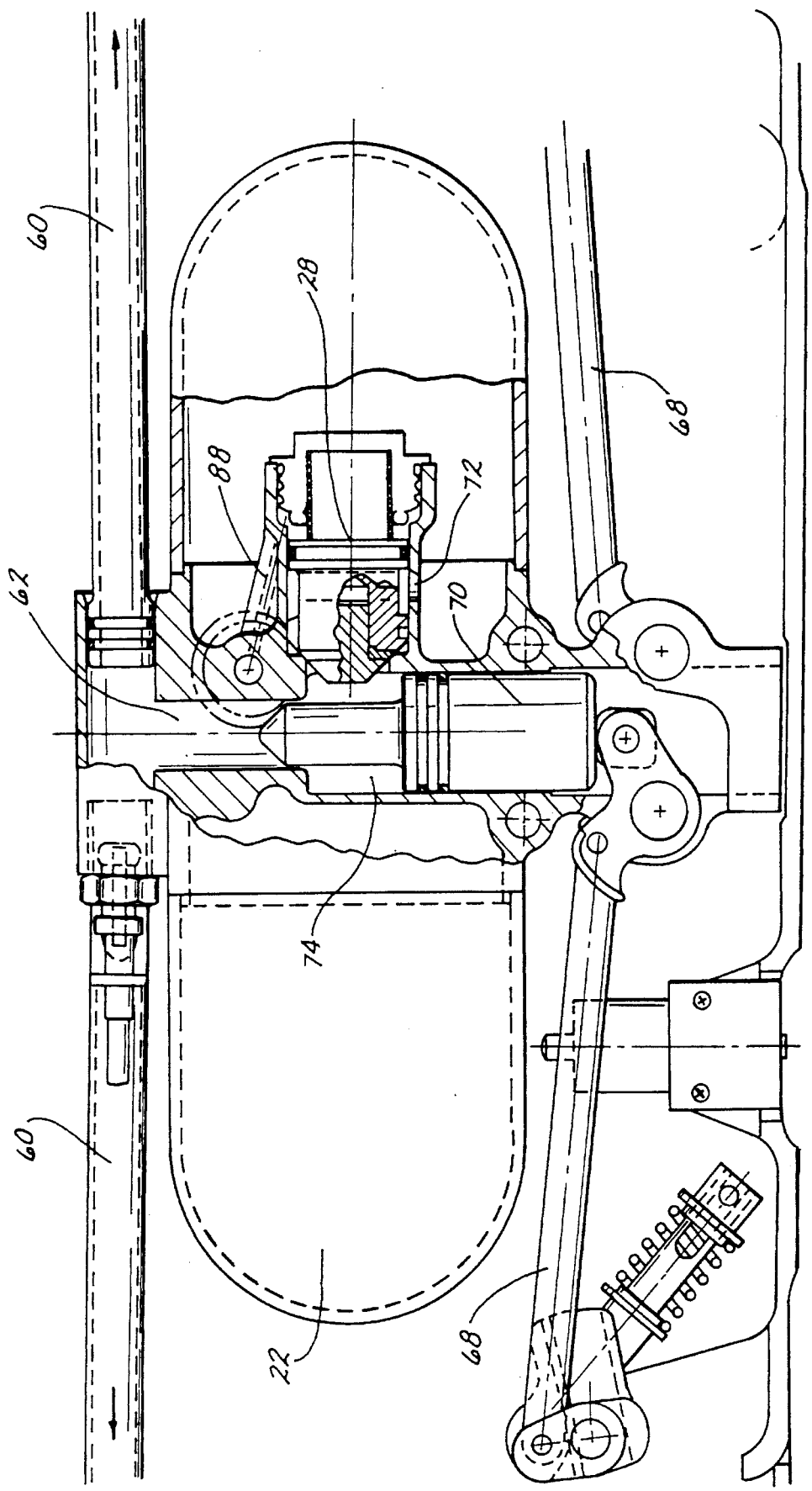

5,583,312

1
COLD GAS EJECTOR RACK

BACKGROUND OF THE INVENTION

This invention relates generally to store carriers for mounting a releasable store on an aircraft and, more particularly, to a stores ejection system from which a store is released with ejective force applied at forward and aft locations by thrusters which are actuated by cold, clean pressurized gas, such as air.

The store referred to herein may be used to contain munitions (i.e. "bombs"), or to contain other material to be dropped from an aircraft. Military aircraft used to dispense bombs, rockets, and other stores in flight usually include racks located beneath the wings and fuselage designed to release the stores upon command. Typical racks are shown in U.S. Pat. Nos. 4,043,525 and 4,347,777, both by the same inventor and assignee as in the present application and incorporated herein by reference.

At the time of target acquisition, a release mechanism is activated which results in mechanical release and subsequent forcible ejection of that weapon away from the aircraft. State of the art bomb ejector racks utilize pyrotechnic (explosive) cartridges which, on ignition, generate high pressure gas for actuating the mechanical release mechanism, as well as for providing high pressure to ejection rams which forcibly eject the store from the aircraft. This method was originated at Douglas Aircraft Company (now an operating division of McDonnell Douglas Corporation) in 1944, and is the current method used on virtually all weapon release devices.

While such pyrotechnic cartridges provide a weight efficient means of storing and releasing energy as a power source, they also have certain undesirable characteristics. For example, a great deal of cleaning and maintenance is required after firing a pyrotechnic device. When fired, the chemical burning of the explosive charge within the pyrotechnic cartridge results in a large amount of residue being deposited within the system. This residue also contains moisture and corrosives. After burning, the moisture in the system tends to further gather debris, form ice, and otherwise clog the internal and external workings of the bomb rack mechanism. Thus, if not properly disassembled and cleaned after a scheduled number of firings, at the cost of a great deal of labor and downtime for the aircraft, the stores rack will quickly become corroded and unreliable, and the required replacement maintenance interval will become unacceptably short.

Other problems associated with the use of pyrotechnic cartridges in bomb ejector systems include the necessity for use of hazardous cleaning solvents, which pose their own unique stowage, use, handling, and disposal considerations. Additionally, ground crew post-flight action is required to remove and dispose of the spent cartridges. Removal of live cartridges is required prior to off-loading unreleased stores, further increasing crew workload and turnaround time. Furthermore, prior to cartridge installation, the ground crew must utilize special equipment to conduct stray voltage checks, in order to assure that an inadvertent firing will not occur. Logistically, adequate supplies of cartridges must be maintained to support bomb rack operation, which imposes additional unique shipping, storage, and handling requirements because of their explosive nature. Cartridges have a limited shelf life as well, before becoming unreliable, so date monitoring and inventory control is necessary. Finally, parts life of the stores rack is limited because of the effects of pyrotechnic gas erosion, resulting in significant logistic and cost burdens.

Stores ejection systems are known in the prior art which avoid the use of pyrotechnic cartridges. For example, U.S. Pat. No. 4,204,456 to Ward discloses a pneumatic bomb ejector, which uses a suitable pressurized gas, such as air or nitrogen, as a stored energy source for actuating the ejector. However, the system is disclosed as being utilizable only with a particular type of customized mechanism which does not employ ejector rams to forcibly eject the store. This means that it may only be used for applications wherein it is not necessary to ensure that the store clears the aircraft slipstream by forcibly ejecting it away from the aircraft. Furthermore, the Ward system is not adaptable to the standardized ejection systems in use in almost all existing military aircraft, limiting its practical applicability. Another problem with the Ward system is that the gas is pre-charged prior to operation. However, as the aircraft climbs to altitude, and the ambient temperature drops, the pressure level drops as well. As the pressure level varies, so does the performance output. Without an onboard pressure maintenance system, the stores ejector may not operate reliably.

Another device which avoids the use of pyrotechnic cartridges is disclosed in U.S. Pat. No. 4,095,762 to Holt. This device includes a system which uses accumulator stored gas (nitrogen is disclosed) as an energy source, but uses a hydraulic subsystem as the energy transfer medium; i.e. the medium used to actuate the ram ejectors. As in Ward, the patentee apparently believed that the accumulator pressure alone is inadequate to function to actuate the ram ejectors. Ward chose therefore to eliminate ram ejectors, while Holt chose to employ a hydraulic energy transfer medium. Disadvantages of Holt's approach include a relatively complicated and heavy dual fluid system, and no onboard pressure replenishment system. Thus, as in the Ward system, as the pressure level varies due to temperature changes, so too does performance output.

An additional problem with the Holt system is that, at the end of the stores ejection event, recocking is required to retract the pistons. When using the stored accumulator pressure, this is accomplished manually after landing. The implication is that some residual pressure remains in the accumulator, which may pose safety concerns. Additionally, the ejector pistons remain extended until after landing and discharging, which increases both drag and radar signature, and is therefore a generally undesirable characteristic.

Still another prior art approach is discussed in U.S. Pat. No. 4,905,568 to Hetzer et al. This patent discloses an ejector mechanism which, like that of Holt, utilizes high pressure gas (again preferably nitrogen) as an energy source, with hydraulics as the energy transfer medium. Hetzer does attempt to compensate for pressure variations in the stored accumulator gas by employing heating coils to alter temperature of the gas as altitude changes. However, no onboard pressure regeneration or recharging system is disclosed or suggested.

What is needed, therefore, is a stores ejection system which employs ejector ram pistons for forcibly ejecting the store away from the aircraft, yet is much more simple, easy to maintain, and durable than systems of that type which are currently available.

SUMMARY OF INVENTION

The invention addresses the aforementioned problems by providing a renewable energy source ejector rack and system for retaining and releasing stores on an aircraft, which has on-board pressurization capability, employs a single pressurization system for two or more release mechanisms, and uses air or other clean non-pyrotechnic pressurized gases both as the energy source and energy transfer medium. The aircraft contains a miniature compressor and purification system. Ambient air is filtered, dried and stored as an energy medium. Since the compressor system is onboard, the pressure can be constantly maintained regardless of temperature change. Using purified air eliminates the excessive cleaning burden imposed when using pyrotechnics, and eliminates the sealing problems associated with hydraulics.

More specifically, a stores ejection system is provided for mounting a jettisonable store on an aircraft which includes an on-board source of pressurized non-pyrotechnic gas, at least one release mechanism for releasably mounting the store, and an actuation system for the release mechanism. Preferably, there are a plurality of release mechanisms and a like number of corresponding actuation systems, each fluidly connected to the source of pressurized gas via a common manifold line. Each actuation system includes an accumulator for receiving and storing pressurized gas from the pressurized gas source at a specified maintenance pressure, a dump valve, and a controller for actuating the dump valve to an open position responsive to a control signal to jettison the store. The dump valve, when actuated, functions to permit the pressurized gas in the accumulator to flow to the release mechanism, thereby actuating the release mechanism to jettison the store. Significantly, the on-board source of pressurized gas is adapted to re-pressurize the accumulator in the actuation system whenever the pressure in the accumulator falls a predetermined amount below the specified operational pressure.

In another aspect of the invention, a stores ejection system is provided for mounting a jettisonable store on an aircraft which includes an on-board source of pressurized non-pyrotechnic gas, at least one release mechanism for releasably mounting the store, and an actuation system for the release mechanism. Each actuation system includes an accumulator for receiving and storing pressurized gas from the pressurized gas source at a specified maintenance pressure, a dump valve, and a controller for actuating the dump valve to an open position responsive to a control signal to jettison the store. The dump valve, when actuated, functions to permit the pressurized gas in the accumulator to flow to the release mechanism, thereby actuating the release mechanism to jettison the store. An important feature of the invention is that the pressurized gas from the on-board pressurization system functions as both the source of energy and as the energy transfer medium for actuating the release mechanism to release and jettison the store.

Yet another aspect of the invention is the provision of a stores ejection system for mounting a jettisonable store on an aircraft which comprises a compressor for providing pressurized gas, a release mechanism for releasably retaining and jettisoning the store, and an actuation system for the release mechanism. The release mechanism comprises a plurality of hooks for releasably retaining the store and a plurality of ejector pistons for forcibly jettisoning the store away from the aircraft when the hooks have been actuated to a release position. A store present switch is employed for detecting whether or not a store has been mounted on the release mechanism, so that the actuation system can be charged if a store is present, or not charged if a store is not present. The actuation system includes an accumulator for receiving and storing at a specified maintenance pressure pressurized gas from the compressor, an enable valve adapted to be actuated to an open condition for receiving pressurized gas from the compressor to charge the accumulator, and to a closed condition for preventing the entry of pressurized gas from the compressor into the actuation system. A dump valve is adapted to permit pressurized gas from the accumulator to flow to the release mechanism when actuated to an open position due to a desire to jettison the store.

In operation, the pressurized gas from the accumulator, when released through the dump valve, actuates the hooks to an open position and simultaneously actuates the ejector pistons to an extended position to thereby release and jettison the store.

The invention, together with additional features and advantages thereof, may best be understood by reference to the following description taken in conjunction with the accompanying illustrative drawing.

BRIEF DESCRIPTION OF THE DRAWINGS

FIG. 3 is an enlarged partial cross-sectional view of the pneumatic actuation system employed in the S & RE module shown in FIG. 2.

DETAILED DESCRIPTION OF THE DRAWINGS

Figure 1:
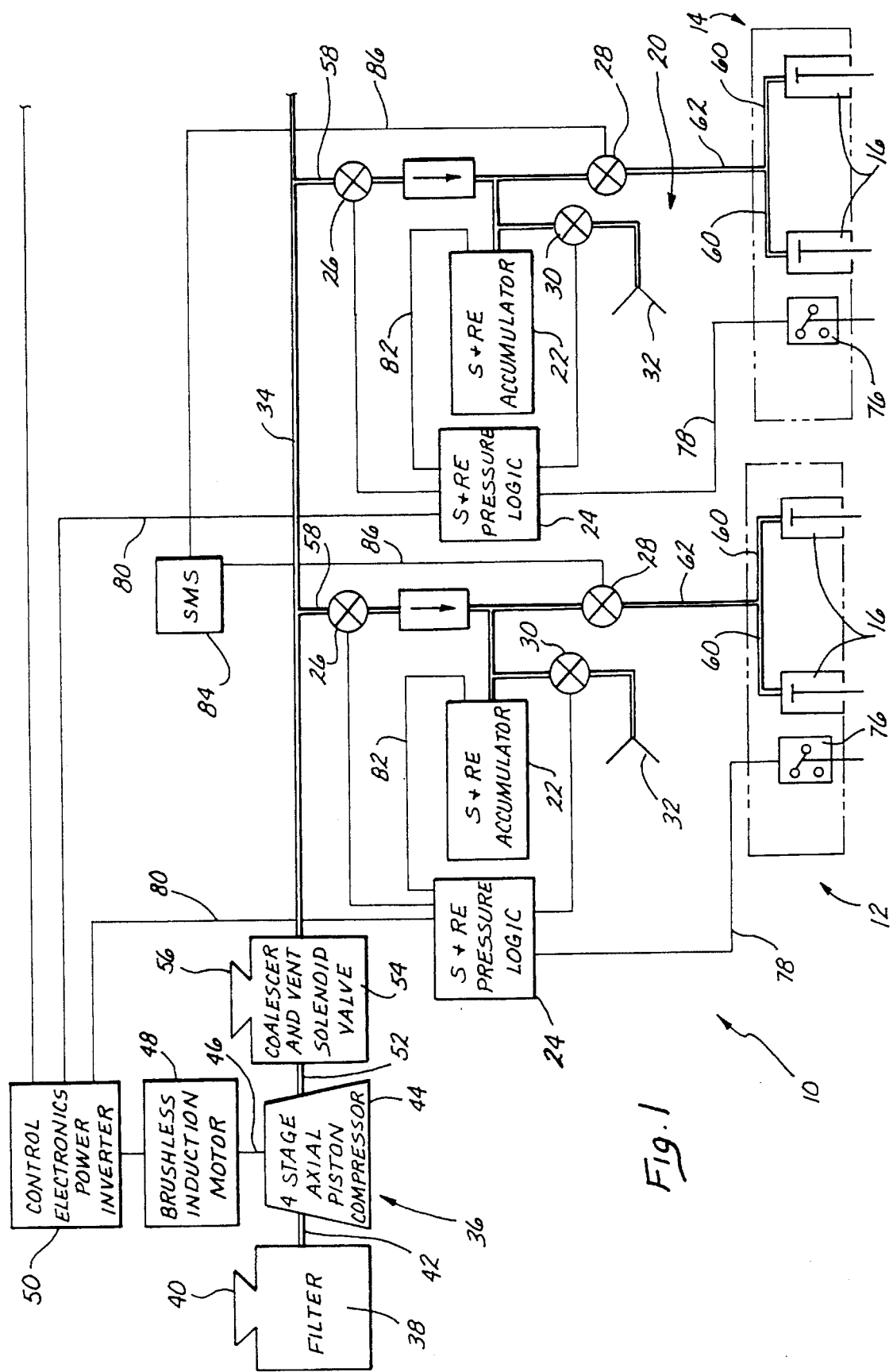
FIG. 1 is a schematic view of the stores ejection system of the invention.

Referring now more particularly to FIG. 1, a pneumatically driven stores ejection system 10 is illustrated schematically. In the illustrated preferred embodiment, two S & RE modules 12 and 14 are included in the system 10, though in actuality any number of such modules may be employed, depending upon the configuration of the aircraft and weapons system with which the system 10 is to be used. The S & RE modules 12, 14 are basically identical stand-alone mechanical units, each preferably comprising a mechanism for releasably retaining and jettisoning a store, including a pair of ejector pistons 16 for thrusting the store clear of the aircraft, and an actuation system for actuating the ejector pistons, including an accumulator 22, an accumulator pressure logic controller 24, an enable valve 26, an ejection dump valve 28, an over-pressure valve 30, and an over-pressure vent 32. In the preferred embodiment, all of these elements are commonly housed within the housing 33 of the module 12, 14 (FIG. 2), for compactness and modularity, but various arrangements could be employed within the scope of the invention, including arrangements wherein some or all of the elements other than the pistons 16 are housed within the aircraft remote from the housing 33.

A manifold conduit 34 provides pressurized fluid, preferably compressed air, from a remotely located pressurization unit 36 to each of the modules 12, 14. Preferably, the pressurization unit incorporates ambient air filtration by means of a filter unit 38 having an ambient air inlet 40. The air then travels via a flow passage 42 through a compressor 44. While a four stage axial piston compressor is preferred, any known type suitable for the inventive application may be alteratively installed. The compressor is preferably driven through a shaft 46 by an electric motor 48 of known type, which in turn is controlled by a control unit 50. Upon exiting the compressor 44, the compressed air travels through a flow passage 52 into a coalescer and vent solenoid valve unit 54, which provides a dual function of drying the air and also operating as a solenoid valve, for purposes to be described hereinbelow. From the unit 54, the dry air exits into the manifold conduit 34, while the excess moisture is vented through a moisture vent 56. While the pressurization unit 36 shown and described is preferred, many alternate embodiments are possible. For example, the filter unit 40 is utilized to minimize wear to the system due to impurities in the ambient air, but is not required. Furthermore, the compressor 44 could alternatively be driven hydraulically or may be driven by or comprise a portion of the main aircraft engines. Also, while air is preferred, any known clean gas could be used, and the unit 36 could actually comprise part of an onboard oxygen or nitrogen generating system. Dry air is desirable in order to minimize system corrosion and because water freezes at high altitude ambient temperatures, resulting in further corrosive conditions within the system. Thus, the use of a drying unit, such as the coalescer unit 56, is preferred. However, the system could be operated without such a unit, albeit with increased required maintenance. Finally, while a single gas generator 36 operated to supply gas to plural S & RE modules is preferred, independent generators for each S & RE module could be used as well, particularly since many available gas generating systems are relatively light and miniaturized, so that undue weight and space penalties are not imposed.

Figure 2:
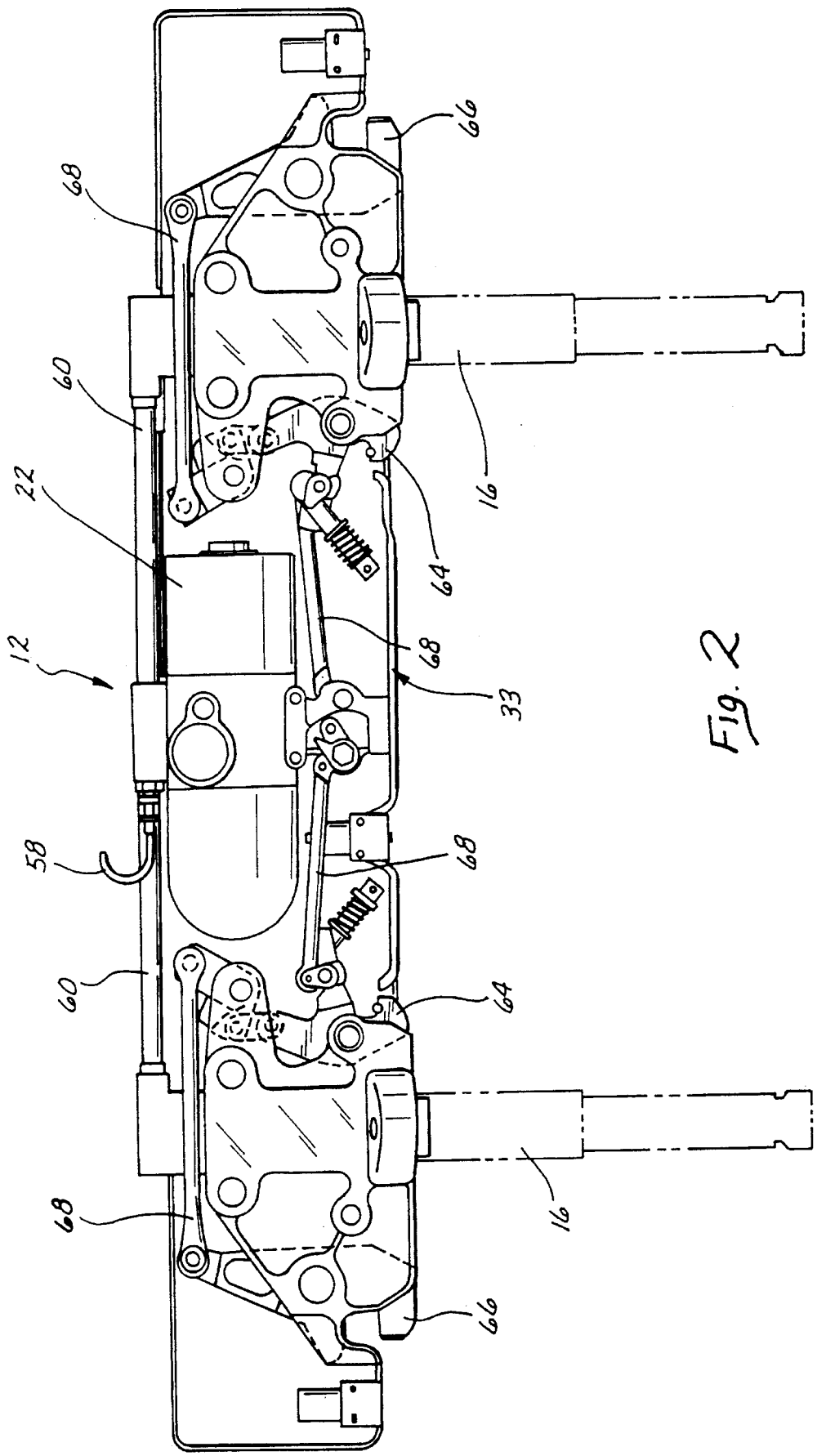
FIG. 2 is a side view of a suspension and release equipment (S & RE) module to be employed in the inventive stores ejection system, illustrating the various elements and their arrangement within the system.

Now with reference to FIGS. 2 and 3, certain particular preferred structural details of the S & RE module 12 are illustrated. It should, of course, be noted that the structure of each of the S & RE modules forming a part of the system 10 are essentially identical, so that FIGS. 2 and 3 could just as well illustrate the S & RE module 14, or any other S & RE module forming a part of the system 10. It should further be noted that this preferred design minimizes the changes necessary to adapt the invention to commercially available S & RE systems. Thus, with the exception of the accumulator and related structure, including the dump valve 28, the illustrated stores ejection system is conventional.

Structurally, the compressor feed line 58 (FIGS. 1 and 2) draws pressurized air from the manifold line 34 into the accumulator 22. Passages 60 provide fluid communication between the accumulator 22 and the pistons 16, in order to actuate the pistons at a desired time, drawing air from a dump valve exit flow line 62 downstream of the dump valve 28. Inside hooks 64 and outside hooks 66 of a type well known in the art are preferably employed to releasably secure the store to the S & RE module in well known fashion. The hooks 64, 66 may be actuated to an open position by means of a hinged hook opening linkage 68, as is also well known in the art, which in turn is driven by a hook opening piston 70 (FIG. 3). The piston 70 is reciprocatingly driven when the dump valve 28, which is pilot pressure-actuated, is driven from the illustrated closed position to an open position, thereby permitting pressurized air from the accumulator 22 to travel through port 72 into the valve area, from whence it further flows into piston chamber 74, thus acting to drive the piston 70 reciprocatingly downwardly to actuate the hook opening linkage 68. At the same time, pressurized air is also permitted by the open valve 28 to flow through the dump valve exit flow line 62 and into the passages 60, thereby actuating the ejector pistons 16 to thrust the store away from the aircraft simultaneously with its release from the hooks 64, 66.

In operation, each S & RE module 12, 14 is initially in an unpressurized state. Loading of a store onto an S & RE module 12, 14 triggers a "store present" signal on a store present switch 76 provided in each module 12, 14. This signal is transmitted by a control line 78 to the pressure logic controller 24, which further transmits it through a second control line 80 to the control unit 50. When the aircraft electrical system is powered up, the "store present" signal causes the control unit 50 to initiate the pressurization unit 36 by starting the compressor 44. Pressurized air thus flows through the manifold conduit 34 and into each of the S & RE modules 12, 14 through feed lines 58. When pressure in the accumulator 22 reaches a prescribed pressure, which in the preferred embodiment is approximately 6000 psi, as detected by the pressure logic controller 24 via a third control line 82, the enable valve 26 (which is preferably a solenoid-operated check valve) closes, isolating the S & RE module 12, 14. When all S & RE modules reach the prescribed pressure, the remotely located pressurization system 36 is shut down. Each S & RE monitor and control system 24 continuously monitors accumulator pressure and periodically activates the pressurization system 36 or vents the accumulator through the over-pressure valve 30 and over-pressure vent 32 to maintain the prescribed pressure. The aircraft stores management system (SMS) 84, which is preferably of a type well known in the art, controls stores release. On the release command by the SMS 84, through a fourth control line 86, the pilot pressure-actuated high flow rate ejection dump valve 28 is actuated to an open position, permitting pressurized air from the accumulator 22 to flow through port 72 (FIG. 3) into the valve area, then into the piston chamber 74, where it simultaneously drives the piston 70 downwardly to release the hooks 64, 66 while also flowing through passages 62 and 60 to pressurize and drive each of the ejector pistons 16 to their extended positions, thus fully releasing and thrusting the store clear of the aircraft. As the hooks 64, 66 open, the store present switch 76 detects a "store gone" condition, which is transmitted to the control units 24, 50. The controller 24 ensures that its corresponding check valve 26 remains closed, isolating the S & RE system from further pressurization. At the end of the ejector piston stroke, vent ports 88 (FIG. 3) are exposed, preferably discharging substantially all residual accumulator pressure and permitting the spring loaded ejector pistons to retract to their stowed position. Thus, unlike prior art systems, the S & RE system may be operated to remain fully discharged and dormant after firing its store, resulting in both greater flight safety and a safer environment for working on the aircraft after landing. Alteratively, it may sometimes be desirable to retain some of the residual accumulator pressure to reduce the charge time and power consumption necessary to recharge the system for the next firing.

Therefore, it may be seen by reviewing the foregoing description of the invention that the pneumatically driven system of the invention has several advantages over other prior art approaches. Operation of the inventive S & RE system utilizing pneumatics is virtually identical to that of an S & RE system driven pyrotechnically, thus reducing risk and exposure. Using pneumatics yields a simplified mechanical design. As with pyrotechnics, the pneumatic system is designed to release its stored energy in the form of high pressure gas, drive actuation and ejection piston, and subsequently vent all excess pressure to atmosphere. At the end of the event, the spring-loaded ejection pistons return to their original position. Furthermore, if the aircraft returns with the store on board, the vent valve 30 can be actuated to dump accumulator pressure to prevent unintended release.

Use of pneumatics in lieu of pyrotechnics provides several operational benefits. Pneumatic S & RE systems preferably operate with purified, dry air, thus eliminating the build-up of residue and corrosive materials produced when using pyrotechnics. Cleaning requirements after firing are eliminated and corrosion control maintenance activities are limited to environmental conditions. Electrical stray voltage checks requiring specialized ground test equipment are eliminated and crew work load and turnaround time is reduced. From a logistics standpoint, the pyrotechnic cartridge-imposed requirements for specialized handling, inventory control, date control, storage and disposal are eliminated.

In comparison to designs using other energy transfer media such as hydraulics, a pneumatic system greatly reduces complexity and part count. When utilizing pneumatics, the need for return side valves, accumulators, piping, seals, etc. is eliminated. Fewer parts result in higher reliability, lower maintenance, and reduced logistical support. Ground support equipment required for fluid handling, storage, filtration prior to usage, and disposal of the hazardous fluid waste is eliminated. Repair and tear down is simplified since there is no fluid to contend with. The use of pneumatics permits the fabrication of components from light-weight materials such as aluminum, titanium, and/or composites, which typically cannot be used within a pyrotechnic gas system due to the high temperature erosive characteristics of pyrotechnics. Castings may even be used in lower pressure levels in the pneumatic system, thereby improving system efficiency and reducing machine time and part count, thus lowering fabrication costs. Periodic tear down, repair, and replacement, caused by pyrotechnic erosion, is substantially eliminated, thereby significantly increasing S & RE service life and reliability while simultaneously reducing maintenance.

While this invention has been described with respect to various specific examples and embodiments, it is to be understood that the invention is not limited thereto and that it can be variously practiced within the scope of the following claims.

What is claimed is:

1. A stores ejection system for mounting a Jettisonable store on an aircraft, the stores ejection system using a gas as the source of energy and the transfer mechanism and comprising:

an on-board source of pressurized non-pyrotechnic gas for providing the source of energy and the transfer mechanism;

at least one pneumatically-driven release and jettison mechanism for releasably mounting the store; and an actuation system for the release mechanism, including an accumulator for receiving and storing pressurized gas from said on-board source of pressurized gas at a specified operating pressure, a dump valve, and a controller for actuating the dump valve to an open position responsive to a control signal to release and jettison the store, the dump valve when actuated functioning to permit the pressurized gas in the accumulator to flow to the release mechanism, thereby actuating the release mechanism to jettison the store;

wherein the on-board source of pressurized gas is adapted to re-pressurize the accumulator in the actuation system whenever the pressure in the accumulator falls a predetermined amount below the specified operating pressure.

2. A stores ejection system as recited in claim 1, wherein the on-board source of pressurized gas includes a compressor.

3. A stores ejection system as recited in claim 2, wherein the on-board source of pressurized gas further includes a filter.

4. A stores ejection system as recited in claim 2, wherein the on-board source of pressurized gas further includes a drying unit.

5. A stores ejection system as recited in claim 1, wherein there are a plurality of said release mechanisms, and a corresponding plurality of said actuation systems, the stores ejection system further including a manifold line fluidly communicating the on-board source of pressurized gas with each of the plurality of actuation systems.

6. A stores ejection system as recited in claim 5, wherein each of said actuation systems further includes an enable valve which is adapted to be actuated to an on condition when the actuation system requires pressurization to attain the specified operating pressure and to be actuated to an off condition when the specified operating pressure is attained.

7. A stores ejection system as recited in claim 5, wherein the pressurized gas source includes a controller which is adapted to actuate the pressurized gas source to an off condition when all of the actuation systems are pressurized to the specified operating pressure, and to actuate the pressurized gas source to an on condition when the operating pressure in at least one of the actuation systems falls more than a predetermined amount below the specified operating pressure.

8. A stores ejection system as recited in claim 1, wherein the actuation system further includes an over-pressure valve and an over-pressure vent, said over-pressure valve being actuable by the controller to vent the pressurized gas from the accumulator through the over-pressure vent whenever an over-pressure condition is detected in the accumulator or when it is desired to disarm the release mechanism.

9. A stores ejection system as recited in claim 1, wherein the release mechanism further comprises a plurality of hooks for releasably retaining the store and a plurality of ejector pistons for forcibly jettisoning the store away from the aircraft when the hooks have been actuated to a release position, both the hooks and the ejector pistons being actuated to release and jettison the store by the pressurized gas exiting the accumulator through the actuation system dump valve.

10. A stores ejection system as recited in claim 1, and further comprising a store present switch for detecting whether or not a store has been mounted on the release mechanism, the store present switch being adapted to transmit a control signal when a store is present to initiate activation of the pressurized gas source to thereby pressurize the accumulator, and being further adapted to transmit a control signal when a store is not present to prevent the actuation system from receiving pressurized gas from said source.

11. A stores ejection system for mounting a jettisonable store on an aircraft, the stores ejection system using a gas as the source of energy and the transfer mechanism and comprising:

an on-board source of pressurized non-pyrotechnic gas for providing the source of energy and transfer mechanism;

at least one pneumatically-driven release and jettison mechanism for releasably mounting the store;

an actuation system for the release mechanism, including an accumulator for receiving and storing pressurized gas from said on-board source of pressurized gas at a specified operating pressure, a dump valve, and a controller for actuating the dump valve to an open position responsive to a control signal to release and jettison the store, the dump valve when actuated functioning to permit the pressurized gas in the accumulator to flow to the release mechanism, thereby actuating the release mechanism to jettison the store, such that the pressurized gas from the on-board source of pressurized gas functions as both the source of energy and as the energy transfer medium for actuating the release mechanism to release and jettison the store.

12. A stores ejection system as recited in claim 11, wherein the on-board source of pressurized gas is adapted to re-pressurize the accumulator in the actuation system whenever the pressure in the accumulator falls a predetermined amount below the specified operating pressure.

13. A stores ejection system as recited in claim 11, wherein the on-board source of pressurized gas includes a compressor.

14. A stores ejection system as recited in claim 11, wherein there are a plurality of said release mechanisms, and a corresponding plurality of said actuation systems, the stores ejection system further including a manifold line fluidly communicating the on-board source of pressurized gas with each of the plurality of actuation systems.

15. A stores ejection system as recited in claim 14, wherein each of said actuation systems further includes an enable valve which is adapted to be actuated to an on condition when the actuation system needs to be pressurized to attain the specified operating pressure and to be actuated to an off condition when the specified operating pressure is attained.

16. A stores ejection system as recited in claim 15, wherein the pressurized gas source includes a controller which is adapted to actuate the pressed gas source to an off condition when all of the actuation systems are pressurized to the specified operating pressure, and to actuate the pressurized gas source to an on condition when the operating pressure in at least one of the actuation systems falls more than a predetermined amount below the specified operating pressure.

17. A stores ejection system as recited in claim 11, wherein the actuation system further includes an over-pressure valve and an over-pressure vent, said over-pressure valve being actuable by the controller to vent the pressurized gas from the accumulator through the over-pressure vent whenever an over-pressure condition is detected in the accumulator or when it is desired to disarm the release mechanism.

18. A stores ejection system as recited in claim 11, wherein the release mechanism further comprises a plurality of hooks for releasably retaining the store and a plurality of ejector pistons for forcibly jettisoning the store away from the aircraft when the hooks have been actuated to a release position, both the hooks and the ejector pistons being actuated to release and jettison the store by the pressurized gas exiting the accumulator through the actuation system dump valve.

19. A stores ejection system as recited in claim 11, and further comprising a stores management system, the stores management system being adapted to provide the control signal to jettison the store.

20. A stores ejection system for mounting a jettisonable store on an aircraft, the stores ejection system using a gas as the source of energy and the transfer mechanism and comprising:

a compressor for providing pressurized gas for the source of energy and transfer mechanism;

a pneumatically-driven release mechanism for releasably retaining and jettisoning the store, comprising a plurality of hooks for releasably retaining the store and a plurality of ejector pistons for forcibly jettisoning the store away from the aircraft when the hooks have been actuated to a release position; and an actuation system for the release mechanism, the actuation system comprising an accumulator for receiving and storing at a specified operating pressure pressurized gas from the compressor, a store present switch for detecting whether or not a store has been mounted on the release mechanism, an enable valve adapted to be actuated to an open condition for receiving pressurized gas from the compressor to charge the accumulator and a closed condition for preventing the entry of pressurized gas from the compressor into the actuation system, and a dump valve adapted to permit pressurized gas from the accumulator to flow to the release mechanism when actuated to an open position;

wherein the pressurized gas from the accumulator, when released through the dump valve, actuates the hooks to an open position and simultaneously actuates the ejector pistons to an extended position to thereby release and jettison the store.

* * * * *